United States Patent
Garbas et al.

(10) Patent No.: US 9,532,047 B2
(45) Date of Patent: Dec. 27, 2016

(54) VIDEO CODING USING TEMPORALLY COHERENT DYNAMIC RANGE MAPPING

(71) Applicant: Fraunhofer-Gesellschaft zur Foerderung der angewandten Forschung e.V., Munich (DE)

(72) Inventors: Jens-Uwe Garbas, Erlangen (DE); Herbert Thoma, Erlangen (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 861 days.

(21) Appl. No.: 13/861,512

(22) Filed: Apr. 12, 2013

(65) Prior Publication Data

US 2013/0223531 A1 Aug. 29, 2013

Related U.S. Application Data

(63) Continuation of application No. PCT/EP2011/067840, filed on Oct. 12, 2011.

(Continued)

(30) Foreign Application Priority Data

May 20, 2011 (EP) .................................. 11166909

(51) Int. Cl.
*H04N 7/26* (2006.01)
*H04N 19/503* (2014.01)
(Continued)

(52) U.S. Cl.
CPC ...... *H04N 19/00575* (2013.01); *H04N 19/105* (2014.11); *H04N 19/136* (2014.11);
(Continued)

(58) Field of Classification Search
CPC ............ H04N 19/00575; H04N 19/105; H04N 19/136; H04N 19/176; H04N 19/40; H04N 19/503; H04N 19/70
See application file for complete search history.

(56) References Cited

U.S. PATENT DOCUMENTS 6,028,608 A 2/2000 Jenkins
2007/0201560 A1 8/2007 Segall et al.
(Continued)

FOREIGN PATENT DOCUMENTS

EP 1 936 994 A2 6/2008
JP 2008-227702 A 9/2008
WO 2010/105036 A1 9/2010

OTHER PUBLICATIONS

Reinhard et al., "High Dynamic Range Imaging: Acquisition, Display, and Image-Based Lighting," Morgan Kaufmann Publishers Inc., 2005, 30 pages.

(Continued)

*Primary Examiner* — Mohammed Rahaman
(74) *Attorney, Agent, or Firm* — Keating & Bennett, LLP

(57) ABSTRACT

A more efficient co-use of dynamic range mapping on the one hand and temporal prediction on the other hand such as, for example, in order to code HDR frame sequences, is achieved by exploiting the concept of weighted prediction in order to transition from the mapping parameter from the reference frame to the currently temporally predicted frame. By this measure, the temporal prediction does not fail and despite the frame-wise variation in the dynamic range mapping, encoding efficiency is, thus, maintained. As a favorable side aspect, weighted temporal prediction is already within the capabilities of existing video coding stages such as, for example, the H.264/AVC.

10 Claims, 6 Drawing Sheets

Related U.S. Application Data

(60) Provisional application No. 61/394,405, filed on Oct. 19, 2010.

(51) Int. Cl.

| | | |
|---|---|---|
| *H04N 19/105* | (2014.01) | |
| *H04N 19/176* | (2014.01) | |
| *H04N 19/70* | (2014.01) | |
| *H04N 19/136* | (2014.01) | |
| *H04N 19/40* | (2014.01) | |

(52) U.S. Cl.
CPC .......... *H04N 19/176* (2014.11); *H04N 19/40* (2014.11); *H04N 19/503* (2014.11); *H04N 19/70* (2014.11)

(56) References Cited

U.S. PATENT DOCUMENTS

| | | |
|---|---|---|
| 2008/0198927 A1 | 8/2008 | Wu |
| 2008/0219352 A1 | 9/2008 | Tokumitsu et al. |
| 2009/0003718 A1* | 1/2009 | Liu ............... H04N 19/176 382/238 |
| 2009/0087111 A1* | 4/2009 | Noda ............... H04N 21/23892 382/238 |
| 2010/0135393 A1* | 6/2010 | Ying Gao ........ H04N 19/00315 375/240.15 |

OTHER PUBLICATIONS

Ferwerda, "Elements of Early Vision for Computer Graphics," IEEE Computer Graphics and Applications, Sep./Oct. 2001, vol. 21, No. 5, pp. 22-33.

Larson et al., "The LogLuv Encoding for Full Gamut, High Dynamic Range Images," Journal of Graphics Tools, vol. 3, No. 1, 1998, pp. 15-31.

Mantiuk et al., "Perception-Motivated High Dynamic Range Video Encoding," ACM Trans. Graph., vol. 23, No. 3, 2004, pp. 733-741.

Okuda et al., "Effective Color Space Representation for Wavelet Based Compression of HDR Images," 14th International Conference on Image Analysis and Processing, 2007, pp. 388-392.

Motra et al., "An Adaptive LogLuv Transform for High Dynamic Range Video Compression," Proceedings of 2010 IEEE 17th International Conference on Image Processing, Sep. 26-29, 2010, pp. 2061-2064.

Boyce, "Weighted Prediction in the H.264/MPEG AVC Video Coding Standard," IEEE International Symposium on Circuits and Systems, May 23-26, 2004, pp. 789-792.

http://www.mpi-inf.mpg.de/resources/hdr/video/.

Mantiuk et al., "Predicting Visible Differences in High Dynamic Range Images—Model and its Calibration," SPIE Human Vision and Electronic Imaging X, 2005, 11 pages.

Aydin et al., "Extending Quality Metrics to Full Luminance Range Images," SPIE Human Vision and Electronic Imaging XIII, Jan. 2008, 10 pages.

English Translation of Official Communication issued in corresponding Russian Patent Application No. 2013122852, mailed on Nov. 24, 2014.

English Abstract of RU 2287909C2.

Official Communication issued in corresponding Japanese Patent Application No. 2013-534258, mailed on Sep. 1, 2015.

Garbas, J. et al., "Temporally Coherent Luminance-to-Luma Mapping for High Dynamic Range Video Coding with H.264/AVC", IEEE International Conference on Acoustics, Speech and Signal Processing, May 22, 2011, pp. 829-832.

\* cited by examiner

VIDEO CODING USING TEMPORALLY COHERENT DYNAMIC RANGE MAPPING

CROSS-REFERENCE TO RELATED APPLICATIONS

This application is a continuation of copending International Application No. PCT/EP2011/067840, filed Oct. 12, 2011, which is incorporated herein by reference in its entirety, and additionally claims priority from European Application No. EP 11166909.9-2223, filed May 20, 2011 and U.S. Application No. 61/394,405, filed Oct. 19, 2010, all of which are incorporated herein by reference in their entirety.

BACKGROUND OF THE INVENTION

The present application is concerned with video coding such as for use with HDR sequences.

So far, most image and video coding applications can cover only a luminance range of about 2 orders of magnitude (low dynamic range (LDR)) [1]. However, the human visual system (HVS) allows us to adapt to light conditions that can cover a range of more than ten orders of magnitude and to perceive about five orders of magnitude simultaneously [2]. With an increasing number of applications that can profit from a representation of the full HDR luminance (e.g., CGI, special effects productions, HDR displays), there will be an increasing demand in HDR video coding methods. Using a standard coding method, like H.264/AVC, will allow for a seamless transition from LDR towards HDR video coding without much additional effort. Note that the term HDR refers to the representation of real luminance values throughout this work and not to a tone-mapped LDR representation, what is sometimes called HDRI.

Since the most natural representation of HDR data, floating-point numbers, does not result in a good compression and is also costly to handle, several authors proposed a suitable mapping from floating-point luminance values to integer luma values [3, 4, 5, 6]. These luminance-to-luma mappings have in common that the associated loss in precision is below the tolerance of the HVS and no distortion is therefore perceived. They further have in common, that they apply a conversion of the HDR image data to the CIELUV color space [1] before further processing. That is, the data is represented by a luminance component Y and the chromacity components (u', v'). The advantage of the (u', v') color representation is
that it is perceptually uniform. That is, equal offsets in this representation represent equal perceptual color differences and therefore they can be linearly mapped to integer values with a bit depth of, e.g., 8 bit. Such a mapping from the perceivable (u', v') interval [0, 0.62] to integer values in the range [0, 255] introduces a maximum absolute quantization error of 0.00172 which is well below the visible threshold.

Since the HVS obeys to the Weber-Fechner law, for a large luminance range, in most works a logarithmic mapping of the luminance Y to luma code values is performed [3, 5, 6]. This results in a constant relative quantization error leading to a perceptually uniform representation of the luminance. E.g., in [3] Larson proposed the following luminance-to-luma mapping (Log Luv transform):

$$L_{15} = \lfloor 256(\log_2(Y) + 64) \rfloor; \quad Y = 2^{\frac{L_{15}+0.5}{256}-64} \quad (1)$$

It maps the real-valued luminances in the interval [5.44× $10^{-20}$, 1.84×$10^{19}$] to 15 bit integer luma values in the range [0, $2^{15}$−1] and vice versa. That is, about 38 orders of luminance magnitude are represented with a relative step size of 0.27%. This is well below the visible quantization threshold of about 1% [1].

However, the dynamic range covered by such a mapping is far beyond the range of what the HVS can simultaneously perceive. Furthermore, there exists no natural image data that spans such high dynamic ranges. Whereas for lossless image compression of data that can undergo further image processing steps this extremely high range and fidelity might be useful, for lossy video encoding that is intended for being watched by human observers, it is not. Consequently, there is no need to reserve bits to represent luminance values that are not perceivable or that do not occur in the source image or video frame. Since this would degrade the compression efficiency, e.g., in HDR still image coding with the TIFF library [3], a scaling factor can be used to scale the source image to an appropriate range before the Log Luv transform. In a similar Log Luv approach [6], scaling has been applied to each individual frame of a video sequence in order to exploit the full range of possible luma code values for a given bit depth.

However, like many HDR video coding methods, the latter is just a straightforward extension of HDR image coding to individual video frames. Therefore, the approach lacks some video specific aspects what significantly degrades the compression efficiency. Most notably, mapping the luminance values of successive frames to different code values with an individual scaling significantly harms the temporal coherence of the sequence. Consequently the temporal motion compensated prediction in the H.264/AVC video coder mostly fails.

Naturally, this is also true for other temporally predicting coders and also for sample values other than luminance values.

SUMMARY

According to an embodiment, a video encoder for encoding a first sequence of frames the sample values which are represented in a first format covering a first dynamic range, may have a sample value converter configured to convert the sample values of the frames of the first sequence from the first format into a second format having a second dynamic range lower than the first dynamic range, using a mapping function which maps a portion out of the first dynamic range, which is settable by a mapping parameter, to the second dynamic range, so as to acquire a second sequence of frames; a video encoding stage configured to encode the second sequence of frames by weighted temporal prediction of a first frame of the second sequence using a second frame of the second sequence of a reconstructed version of the second frame of the second sequence, weighted by a weighting parameter and offset by an offset parameter, as a reference; and a parameter setter for setting the weighting parameter and the offset parameter depending on the mapping parameter for the second frame of the first sequence corresponding to the second frame of the second sequence, and setting the mapping parameter for a first frame of the first sequence corresponding to the first frame of the second sequence, depending on the mapping parameter for the second frame of the first sequence, the weighting parameter and the offset parameter.

According to another embodiment, a video decoder for reconstructing a first sequence of frames, the sample values of which are represented in a first format covering a first dynamic range, from a data stream, may have a video decoding stage configured to reconstruct, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference; a parameter setter configured to set a mapping parameter for the first frame of the second sequence depending on a mapping parameter for the second frame of the second sequence, the weighting parameter and the offset parameter, and a sample value reconverter configured to convert the sample values of the frames of the second sequence from the second format to the first format using a mapping function which maps the second dynamic range onto a portion out of the first dynamic range which is set by the mapping parameter for the respective frame of the second sequence.

According to another embodiment, a method for encoding a first sequence of frames the sample values which are represented in a first format covering a first dynamic range may have the steps of converting the sample values of the frames of the first sequence from the first format into a second format having a second dynamic range lower than the first dynamic range, using a mapping function which maps a portion out of the first dynamic range, which is settable by a mapping parameter, to the second dynamic range, so as to acquire a second sequence of frames; encoding the second sequence of frames by weighted temporal prediction of a first frame of the second sequence using a second frame of the second sequence of a reconstructed version of the second frame of the second sequence, weighted by a weighting parameter and offset by an offset parameter, as a reference; and setting the weighting parameter and the offset parameter depending on the mapping parameter for the second frame of the first sequence corresponding to the second frame of the second sequence, and setting the mapping parameter for a first frame of the first sequence corresponding to the first frame of the second sequence, depending on the mapping parameter for the second frame of the first sequence, the weighting parameter and the offset parameter.

According to another embodiment, a method for reconstructing a first sequence of frames, the sample values of which are represented in a first format covering a first dynamic range, from a data stream may have the steps of reconstructing, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference; setting a mapping parameter for the first frame of the second sequence depending on a mapping parameter for the second frame of the second sequence; the weighting parameter and the offset parameter, and converting the sample values of the frames of the second sequence from the second format to the first format using a mapping function which maps the second dynamic range onto a portion out of the first dynamic range which is set by the mapping parameter for the respective frame of the second sequence.

Another embodiment may have a data stream from which a first sequence of frames, the sample values of which are represented in a first format covering a first dynamic range, is reconstructable, wherein the first sequence is encoded into the data stream indirectly via a second sequence of frames the sample values of which are represented in a second format covering a second dynamic range lower than the first dynamic range, the second sequence being encoded into the data stream by a weighted temporal prediction of a first frame of the second sequence using a second frame of the second sequence, weighted by a weighting parameter and offset by an offset parameter, as a reference, wherein the weighting parameter and the offset parameter are comprised be the data stream such that a mapping parameter for the first frame of the second sequence depends on a mapping parameter for the second frame of the second sequence, the weighting parameter and the offset parameter, and the sample values of the frames of the second sequence is converted from the second format to the first format using a mapping function which maps the second dynamic range onto a portion out of the first dynamic range which is set by the mapping parameter for the respective frame of the second sequence, reconstruct the first sequence.

According to another embodiment, a computer readable digital storage medium may have stored thereon a computer program having a program code for performing, when running on a computer, a method for encoding a first sequence of frames the sample values which are represented in a first format covering a first dynamic range, the method having the steps of converting the sample values of the frames of the first sequence from the first format into a second format having a second dynamic range lower than the first dynamic range, using a mapping function which maps a portion out of the first dynamic range, which is settable by a mapping parameter, to the second dynamic range, so as to acquire a second sequence of frames; encoding the second sequence of frames by weighted temporal prediction of a first frame of the second sequence using a second frame of the second sequence of a reconstructed version of the second frame of the second sequence, weighted by a weighting parameter and offset by an offset parameter, as a reference; and setting the weighting parameter and the offset parameter depending on the mapping parameter for the second frame of the first sequence corresponding to the second frame of the second sequence, and setting the mapping parameter for a first frame of the first sequence corresponding to the first frame of the second sequence, depending on the mapping parameter for the second frame of the first sequence, the weighting parameter and the offset parameter.

According to another embodiment, a computer readable digital storage medium may have stored thereon a computer program having a program code for performing, when running on a computer, a method for reconstructing a first sequence of frames, the sample values of which are represented in a first format covering a first dynamic range, from a data stream, having the steps of reconstructing, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference; setting a mapping parameter for the first frame of the second sequence depending on a mapping parameter for the second frame of the second sequence; the weighting parameter and the offset parameter, and converting the sample values of the frames of the second sequence from the second format to the first format using a mapping function which maps the second dynamic range onto a portion out of the first dynamic range which is set by the mapping parameter for the respective frame of the second sequence.

A basic idea underlying the present invention is that a more efficient co-use of dynamic range mapping on the one hand and temporal prediction on the other hand such as, for example, in order to code HDR frame sequences, may be achieved by exploiting the concept of weighted prediction in order to transition the mapping parameter from the reference frame to the currently temporally predicted frame. By this measure, the temporal prediction does not fail and despite the frame-wise variation in the dynamic range mapping, encoding efficiency is, thus, maintained. As a favorable side aspect, weighted temporal prediction is already within the capabilities of existing video coding stages such as, for example, the H.264/AVC.

BRIEF DESCRIPTION OF THE DRAWINGS

Embodiments of the present invention will be described in more detail below. In particular.

DETAILED DESCRIPTION OF THE INVENTION

Before the embodiments of the present invention are described in more detail below with respect to the figures, it should be noted that equal elements occurring within different ones of these figures, are indicated using equal reference signs, and accordingly, a description of these elements with respect to one figure is also applicable with respect to another figure as long as the specific details brought forward with respect to the latter do not teach to the contrary.

Figure 1:
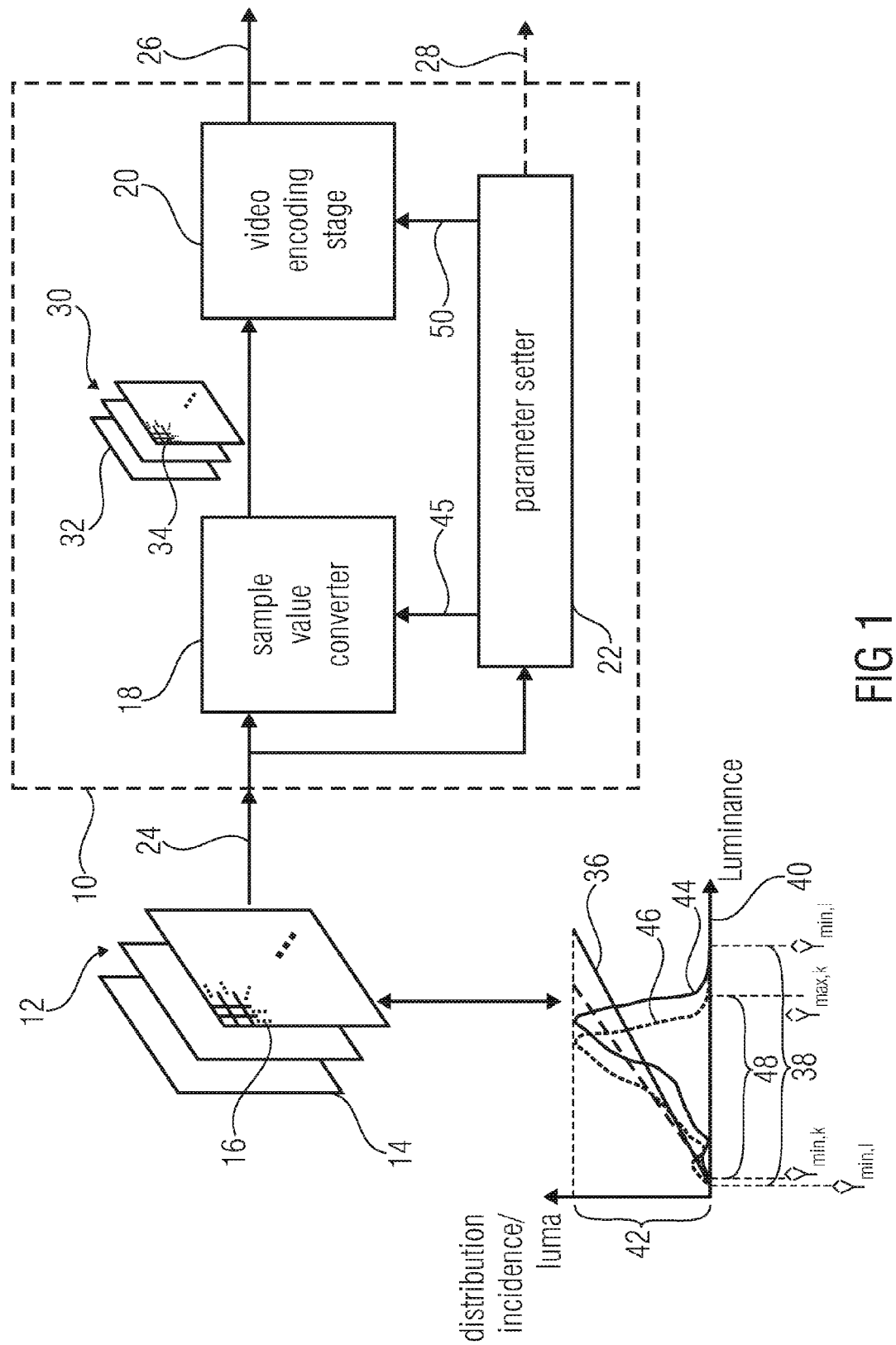
FIG. 1 shows a block diagram of a video encoder according to an embodiment.

FIG. 1 shows a video encoder 10 according to an embodiment of the present invention. The video encoder 10 is configured to encode a first sequence 12 of frames 14 the sample value 16 of which are represented in a first format covering a first dynamic range. For example, the frame sequence 12 may be a video such as an HDR video, and the sample values 16 may represent a spatial sampling of the luminance distribution of the individual frames 14. The first format in which the sample values 16 are represented may be a floating point format. Detailed examples will be outlined below. However, it should be noted that the type of information spatially sampled by the sample values 16 is not restricted to luminance. Rather, other types of information could be the object of the sample values 16 instead. For example, frames 14 could represent depth maps, and accordingly, the sequence 12 could represent a temporal sampling of a depth map of a certain scene or the like.

The video encoder 10 comprises a sample value converter 18, a video encoding stage 20 and a parameter setter 22. Sample value converter 18 and video encoding stage 20 are connected between an input 24 and an output 26 of video encoder 10 wherein the input 24 is configured to receive frame sequence 12 while output 26 is for outputting the data stream resulting from encoding sequence 12 by video encoder 10. Parameter setter 22 has an input connected to input 24 and outputs connected to parameter inputs of sample value converter 18 and video encoding stage 20, respectively. As indicated by a dashed line 28, parameter setter 22 may also output side information contributing to the data stream 26 as will be outlined in more detail further below.

The sample value converter 18 is configured to convert the sample values 16 of the frames 14 of the first sequence 12 from the first format into a second format having a second dynamic range lower than the first dynamic range. Thus, sample value converter 18 forwards to the video encoding stage 20 a second sequence 30 of frames 32 which completely corresponds to sequence 12 except for the sample values 16 having been converted from the first format into the second format. Accordingly, each frame 32 corresponds to a respective frame 14 of sequence 12, with frames 32 being arranged within sequence 30 in the same order as the corresponding frames 14 within sequence 12.

The second format may be, for example, an integer format in which, for example, the sample values 34 of frames 32 are represented in, for example, PCM coded form using a binary code. For example, the sample values 34 may be represented by n bits with n, for example, being equal to 8, 9 or 10. In case of eight bits, for example, the second format would, thus, merely cover a sample value range of about two orders of magnitude ($10^2 \approx 2^8$), and in case of ten bits, for example, the second format would, thus, merely cover a sample value range of about three orders of magnitude ($10^3 \approx 2^{10}$). Compared thereto, the first format by way of which the sample values 16 are represented, covers a greater, or even far greater dynamic range. As mentioned above, and in accordance with the more detailed embodiments outlined below, the first format may be a floating-point format. However, it should be noted that the first format could also be an integer format with using, however, more bits than the second format.

In order to convert the sample values of the frames 14 of the first sequence 12 from the first format into the second format, sample value converter 18 uses a mapping function 36 which maps a portion 38 out of the first dynamic range 40 to the second dynamic range 42. In particular, the sample value converter 18 is configured such that the portion 38 which the mapping function 36 maps to the dynamic range 42 corresponding to the second format, is settable by a mapping parameter 44 which is set by parameter setter 22 as will be outlined in more detail below, on a frame-wise basis. In the specific embodiments outlined in more detail below, the mapping function 36 represents a linear mapping function between the first dynamic range 40 in logarithmic domain to the second dynamic range in linear domain. However, other strictly monotonic functions may also be used instead of this type of function. As will become clearer from the further description below, portion 38 is set by parameter setter 22 on a frame-by-frame basis so as to capture substantially all information contained within the respective frame 14 in the first format. Briefly spoken, parameter setter 22 seeks to position and dimension—or scale—portion 38 within the first dynamic range 40 such that all perceptually relevant samples within the respective frame 14 have their sample value 16 within that portion 38 so that all these sample values are correctly mapped—without being clipped—to the second dynamic range of the second format 42. An exemplary distribution 44 of sample values 16 within a current frame is exemplarily shown in FIG. 1. In the example of FIG. 1, this distribution is completely contained within portion 38. As will be outlined in more detail below, the distribution 44 may merely represent the distribution of sample values 16 within a certain part of frame 14 such as a center portion thereof as such a center portion is most likely to contain the most important portion in the scene of a video content.

As is obviously clear, the distribution of sample values 16 within the first dynamic range 40 may change from frame to frame, and accordingly, FIG. 1 shows with dotted lines 46 exemplarily a distribution of another frame 14 within sequence 12. As exemplarily shown in FIG. 1, this distribution 46 may, for example, be displaced relative to and/or be narrower than distribution 44 of the current frame. Accordingly, parameter setter 22 may have set the mapping parameter 44 for the frame with sample value distribution 46 differently from the mapping parameter 45 defining portion 48. For example, sample value distribution 46 may set the mapping parameter for these frames such that portion 48 approximates a portion of the first dynamic range 40 occupied by distribution 46, i.e., such that portion 48 is as small as possible but still covers the range of distribution 46, with the same applying to portion 38 with respect to distribution 44.

Thus, sequence 30 substantially corresponds to sequence 12 with the sample values, however, being represented in another format. Viewing sequence 30, however, would result in an unpleasant impression as the sample values 34 of one frame within sequence 30 would be defined with respect to another luminance portion than sample values 34 within another frame of the same sequence. For example, the afore-mentioned frames of sequence 12 would have the sample values 16 mapped to sample values 34 residing within portions 38 and 48, respectively. Thus, a sample value 34 of, for example, one in one frame would very likely correspond to another actual luminance value than a sample value of one within a different frame of sequence 30. Without additional measures, video encoding stage 20 would, thus, not be able to perform a usual temporal prediction using, for example, motion-compensated prediction as the needed motion vector search would most likely not be successful.

In particular, video encoding stage 20 is configured to encode the second sequence 30 of frames 32 by weighted temporal prediction of a first frame of the second sequence 30 using a second frame of the second sequence 30 or a reconstructed version of the second frame of the second sequence 30, weighted by a weighting parameter and offset by an offset parameter, as a reference. In other words, video encoding stage 20 may temporally predict a current frame 32 of sequence 30 by motion-compensated prediction and with using another, previously encoded frame 32 of sequence 30 as a reference. The motion-compensated prediction may be performed on a block-by-block basis. Motion prediction data such as motion vectors and reference frame index are inserted into the data stream as side information, along with the weighting/offset parameters mentioned below. Each temporally predicted block may have associated therewith a motion vector which video encoding stage 20 determines by determining a best match of the content of the current block of the current frame 32 within the reference, i.e. the reference frame weighted and sample-value-offset by parameters 50, with trying various displacements (motion-vectors) relative to the position corresponding to the position of the block in the current frame. In order to restrict the search overhead, video encoding stage 20 restricts the search to some search range.

As will become clearer below, due to the fact that video encoding stage 20 uses weighted temporal prediction, it is possible for parameter setter 22 to adapt the reference frame to the current frame with respect to the difference in the associated mapping portion 48 and 38, respectively.

In particular, parameter setter 22 sets the weighting parameter and the offset parameter, illustrated together in FIG. 1 by arrow 50, depending on the mapping parameter 45 for the reference frame, with the mapping parameter for the reference frame being related to the mapping parameter for the current frame via the weighting parameter and the offset parameter 50 as will be outlined in more detail below. In other words, the parameter setter 22 is responsible for setting both, weighting parameter and offset parameter 50 for the current frame on the one hand, and the mapping parameter 45 for the current frame on the other hand. However, parameter setter 22 is not free to set the weighting and offset parameters 50 independently from setting mapping parameter 45 for the current frame. Rather, both settings are related to each other in a, for example, uniquely defined way. Accordingly, in fact, parameter setter 22 sets the weighting and offset parameters 50 and the mapping parameter 45 concurrently and, in particular, such that the weighting/offset parameters 50 displace and scale the dimension of portion 48 of the reference frame such that the interval resulting from this displacement and scaling yields a portion 38 for the current frame which is suitable for capturing the perceptually relevant portion of distribution 44 as discussed above. The weighting/offset parameters 50 displace and scale the dimension of portion 48 of the reference frame by way of their application to the reference frame: The weighting/offset parameters 50 map all possible values within portion 48 onto values together spanning a range which defines portion 38.

Before describing the functionality of the video encoder of FIG. 1 in accordance with specific embodiments in more detail below, an embodiment for an implementation of the video encoding stage 20 is described with respect to FIG. 2. In accordance with the embodiment of FIG. 2, the video encoding stage 20 comprises a residual coder 60, an entropy encoder 62, a residual reconstructor 64, a temporal predictor 66, a subtracter 68, an adder 70, a further adder 72, and a weighter or multiplier 74. Subtracter 68, residual coder 60 and entropy encoder 62 are connected, in the order mentioned, between an input 76 of video encoding stage 20, which, in turn, is connected to an output of sample value converter 18, and an output 78 of video encoding stage 20 which, in turn, is connected to output 26 of video encoder 10. Residual reconstructor 64 has an input connected to the output of residual coder 60. A first input of adder 70 is connected to an output of residual reconstructor 64. Multiplier 74, adder 72 and temporal predictor 66 form a loop and are serially connected, in the order mentioned, between an output of adder 70 and a further input thereof. Concurrently, the serial connection of multiplier 74, adder 72 and temporal predictor 66 is connected to a further, subtractive input of subtracter 68. The values applied to the further inputs of adder 72 and multiplier 74, respectively, are determined by weighting an offset parameters 50 entering at a parameter input 80 of video encoding stage 20.

In operation, a current frame enters input 76 while a temporal prediction of the current frame is applied at the subtractive input of subtracter 68. The prediction residual 82 resulting from subtracting the temporal prediction 84 from the current frame is coded by residual coder 60. Residual coder 60 may, for example, subject residual signal 82 to a transform, such as a spectrally decomposing transform, wherein residual coder 60 may perform this transform on a block-by-block basis. Additionally or alternatively, residual coder 60 may apply a quantization onto residual signal 82 to reduce the information content contained within the prediction residual 82 to be encoded into the data stream. Residual coder 60 may use a quantizer step-size parameter as parameter for the quantization which may additionally be changeable from frame to frame as is illustratively shown by the dashed arrow 86. At the output of residual coder 60, thus, a lossy coded version 88 of the prediction residual is obtained. Same is coded into the data stream at output 78 by entropy encoder 62 in a lossless way.

Residual reconstructor 64 recovers a reconstructed version 90 of the prediction residual at its output connected to a first input of adder 70. At the other input of adder 70, the result of the temporal prediction 84 for the current frame enters, and accordingly, adder 70 combines reconstructed residual 90 and temporal prediction 84 to yield a reconstructed version of the current frame forming the basis of the temporal prediction for the next frame. As will be outlined in more detail below, multiplier 74 multiplies or scales each sample value of reconstructed version 70 depending on a weighting parameter ($\hat{w}$, log WD), and adder 72 adds an offset depending on the offset parameter $\hat{o}$ to each thus scaled sample value. By this measure, the sample values of the reconstructed version 70 are displaced to a corresponding luminance position within portion 38 of the current frame to be temporally predicted next. Accordingly, at the output of adder 72, a weighted and offset reference frame 92 results, based on which temporal predictor 66 performs the temporal prediction using, for example, motion prediction. For example, temporal predictor 66 uses for a certain block of the current frame, a potentially interpolated and displaced (according to a motion-vector) portion out of reference frame 92 as a prediction for this block of the current frame currently entering input 76.

Thus, as video encoding stage 20 uses weighted temporal prediction, temporal predictor 66 uses the reconstructed version of a previously encoded frame in a sample-value-weighted and sample-value-offset from 92 rather than directly, as output by adder 70. Thereby, the difference in the positioning and dimensioning of portions 38 and 48 between these frames is balanced. In even other words, the balancing is guaranteed by parameter setter 22 which, in turn, sets the weighting and offset parameters 50 entering at input 80 appropriately.

Thus, returning to FIG. 1 again, parameter setter 22 may be configured to determine an occupied portion of the first dynamic range 40 within which the sample values 16 of the current frame of the first sequence 12 are distributed, with then setting the weighting and offset parameters 50 such that the portion 38 set by the mapping parameter 55 for the current frame approximates the occupied portion. In even other words, parameter setter 22 may firstly inspect distribution 44 in order to determine an interesting occupied portion of the first dynamic range 40. Then, parameter setter 22 may set the weighting and offset parameters 50 of the current frame such that the application of these parameters 50 onto the sample values of the reconstructed version 70 effectively leads to displacement and scaling of the portion 48 of the frame of which the reconstructed version 70 represents a reconstruction, to yield a portion 38 approximating the occupied portion defined by distribution 44.

In this regard, it should be noted that internally, video encoding stage 20 may uses a higher dynamic range, such as a higher number of bits, in order to represent the scaled and sample-value-offset reference frame resulting from the application of the weighting and offset parameters at input 80 onto the reconstruction 70 of the reference frame, i.e. for reference frame 92, as compared to the dynamic range of sequence 30, so that the application of these parameters does not lead to any clipping problems. The number of representation bits may be increased by two, for example.

Thus, in even further detail, parameter setter 22 may be configured to set the offset parameter $\hat{o}$ according to a deviation between an upper bound, or a deviation between a lower bound, of the portions 38, 48 set by the mapping parameters for the current and reference frames, respectively, and set the weighting parameter (log WD, $\hat{w}$) according to a deviation between the length of the portions 38, 48, respectively. In specific embodiments outlined further below, for example, the sample value converter 18 is configured to convert the sample values $\hat{Y}$ of the frames 14 of the first sequence 12 from the first format into the second format according to $$b \cdot (\log_m(\hat{Y}) - a)$$

wherein b and a are comprised by the mapping parameter 45 and are related to a lower bound $\hat{Y}_{min}$ and upper bound $\hat{Y}_{max}$ of the portion 38 out of the first dynamic range 40, $\hat{Y}_{min}$ to $\hat{Y}_{max}$, according to $$b = \frac{2^n - 1}{\log_m(\hat{Y}_{max} / \hat{Y}_{min})}, a = \log_m(\hat{Y}_{min})$$

wherein $\log_m$ is a logarithmic function to a base m, and n is an integer indicating a number of integer representation bits of the second format. If so, the parameter setter may be configured to determine an occupied portion of the first dynamic range within which the sample values 16 of the first frame 14 of the first sequence 12 are distributed, and set the weighting parameter and the offset parameter such that $$\frac{\log_m(\hat{Y}_{max,k} / \hat{Y}_{min,k})}{\log_m(\hat{Y}_{max,l} / \hat{Y}_{min,l})} = \tilde{w}$$

$$\frac{\log_m(\hat{Y}_{min,k} / \hat{Y}_{min,l})}{\log_m(\hat{Y}_{max,l} / \hat{Y}_{min,l})} 2^n - 1 = \tilde{o}$$

under the constraints that $$\hat{Y}_{max,l} \geq Y_{max,l} \text{ and } \hat{Y}_{min,l} \leq Y_{min,l}$$

wherein $Y_{min}$ is a lower bound, and $Y_{max}$ is an upper bound of the occupied portion.

The precision and range of the weighting and offset parameter might be limited, for example, by the video coding stage 20, which operates, for example, in accordance with H.264/AVC. If so, the parameter setter may be configured to determine an occupied portion of the first dynamic range within which the sample values 16 of the first frame 14 of the first sequence 12 are distributed, and set the weighting parameter and the offset parameter such that $$\frac{\log_m(\hat{Y}_{max,k}/\hat{Y}_{min,k})}{\log_m(\hat{Y}_{max,l}/\hat{Y}_{min,l})} 2^{\log WD} = \hat{w}$$

$$\frac{\log_m(\hat{Y}_{min,k}/\hat{Y}_{min,l})}{\log_m(\hat{Y}_{max,l}/\hat{Y}_{min,l})} \frac{2^n-1}{2^{n-n_0}} = \hat{o}$$

under the constraints that $$\hat{Y}_{max,l} \geq Y_{max,l} \text{ and } \hat{Y}_{min,l} \leq Y_{min,l}$$

wherein $Y_{min}$ is a lower bound, and $Y_{max}$ is an upper bound of the occupied portion, $n_0$ is an integer related to a definition range of ô, index l indexes the current frame of the frame sequence, index k indexes the reference frame of the frame sequence, ŵ and log WD are comprised by the weighting parameter, and ô is comprised by the offset parameter. The admissible precision for ŵ and ô may be integer numbers, the range of ŵ may be, for example, limited to $-128 \leq \hat{w} \leq 127$.

Further, as will also be discussed with respect to the detailed embodiments outlined below, the video encoding stage 20 and the residual coders 60 may be configured to use a quantizer step-size parameter in encoding the second sequence 30 of frames 32 and the parameter setter 22 may be configured to set the quantizer step-size parameter for the frames 32 of the sequence 30 depending on the length of the respective portion 38, 48, set for the respective frame. By this measure, it is possible to harmonize the quantization noise in its temporal variation as it would other wise occur if using a static quantizer step-size parameter due to the temporal variation of the length of portions 38 and 48, respectively. The parameter setter 22 may be configured to encode the quantizer step-size parameter into the data stream differentially to a quantized step-size parameter for a starting frame of the second sequence such as the I frame of an IPPPPP . . . sequence.

After having described an embodiment for a video encoder, with respect to FIG. 3, a video decoder 100 in accordance with an embodiment is described below. The video decoder is for reconstructing a sequence 102 of frames 104 the sample values 106 of which are represented in a first format covering a first a dynamic range, from a data stream, such as one generated by the video encoder of FIG. 1. The format in which values 106 are represented, may be the format underlying sample values 16. However, this is not mandatory.

The video decoder 100 comprises a video decoding stage 108, a parameter setter 110 and a sample value reconverter 112. Further, the video decoder 100 comprises an input 114 at which the afore-mentioned data stream enters video decoder 100, and an output 116 for outputting sequence 102. Between input 114 and output 116, the video decoding stage 108 and the sample value reconverter 112 are serially connected in the order mentioned. Parameter setter 110 is connected between input 114 and a parameter input of sample value reconverter 112.

Figure 2:
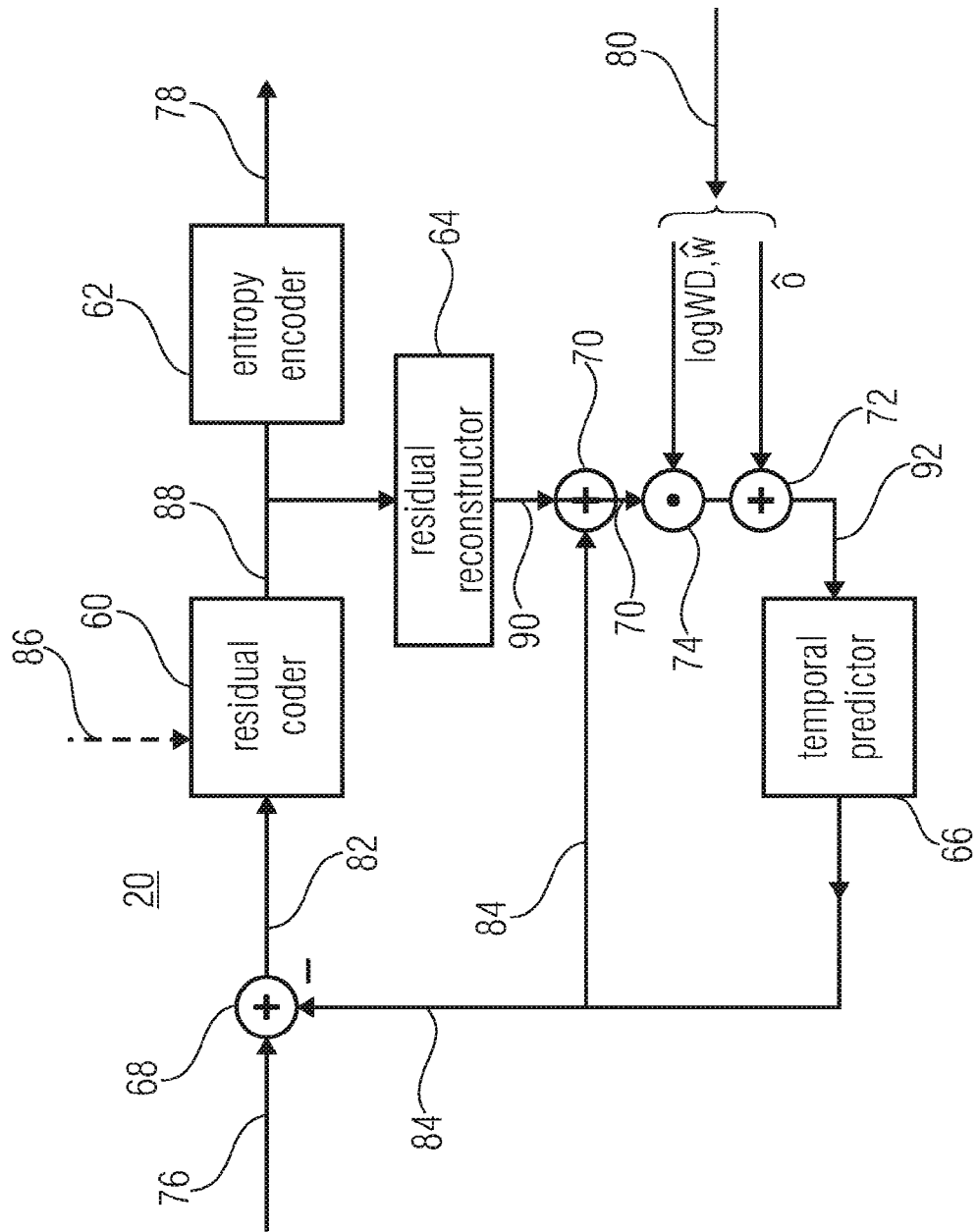
FIG. 2 shows a block diagram of a video encoding stage of FIG. 1 according to an embodiment.
Figure 4:
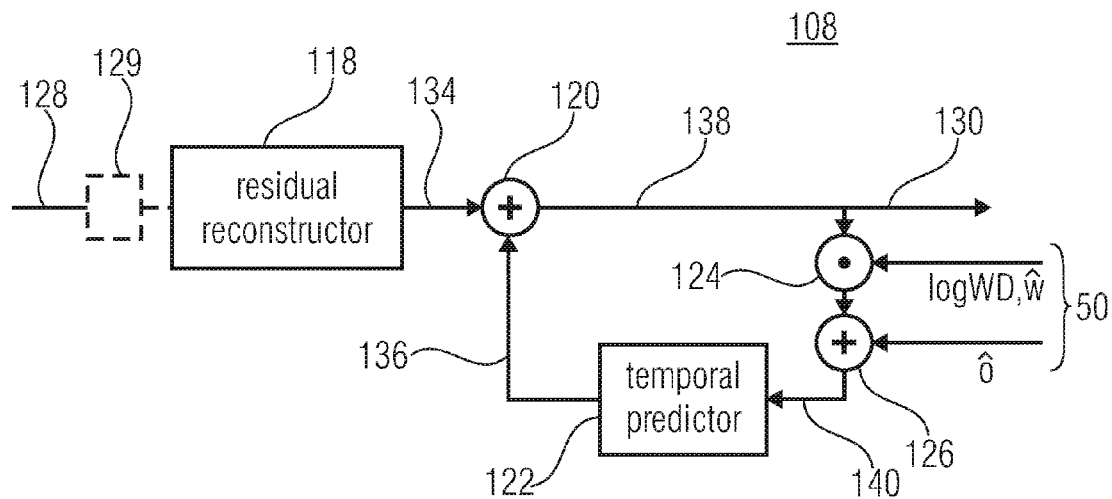
FIG. 4 shows a block diagram of a video decoding stage according to an embodiment.

With respect to FIG. 4 it is shown that the video decoding stage 108 may be implemented substantially similar to components 64, 70, 74, 72, and 66 of the encoder of FIG. 2. In particular, video decoding stage 108 may comprise a residual reconstructor 118, an adder 120, a temporal predictor 122, a scaler/multiplier 124 and a further adder 126. Residual reconstructor 118 and adder 120 may be serially connected between an input 128 of video decoding stage 108 which, in turn, is connected to input 114, and an output 130 of video decoding stage which, in turn, is connected to sample value reconverter 112. In form of a loop, multiplier 124, adder 126 and temporal predictor 122 are serially connected in the order mentioned between an output of adder 120 and a further input thereof. The values applied to the further inputs of multiplier 124 and adder 126 are controlled according to the weighting and offset parameters which the video decoding stage 108 derives from the data stream entering input 128.

Thus, after having described the internal structure of the video decoder 100 and the video decoding stage 108, respectively, in accordance with an embodiment, their mode of operation thereof is described in more detail below.

As already mentioned above, the video decoder 100 is for decoding the data stream generated, for example, by the video encoder of FIG. 1. The data stream has been derived from sequence 30 in the lower dynamic range format and using the weighting and offset parameters 50 which the video encoding stage 20 inserted into the data stream as side information. Accordingly, the video decoder has access to the weighting and offset parameters 50 used at the encoding side and is able to emulate the reconstruction at the encoding side using the parameters finally chosen at the encoding side by way of, for example, some rate/distortion optimization.

In particular, the video decoding stage 108 is configured to reconstruct, from the data stream entering input 114, the second sequence 30' of frames 32' which corresponds to sequence 30 of FIG. 1 apart from the coding loss such as the quantization loss introduced by video encoding stage 20. The sample values 34' of frames 32' are, accordingly, also represented in the second format covering the second dynamic range 42 which is lower than the dynamic range of the final reconstructed sequence 102. Just as it was the case with the video encoding stage 20, the video decoding stage 108 performs the reconstruction by a weighted temporal prediction of a current frame of the second sequence 30' using a reference frame of the second sequence 30', weighted by a weighting parameter and offset by an offset parameter, both comprised by the data stream entering input 114, as a reference. The parameter setter 110, in turn, is configured to set the mapping parameter 132 for the current frame of the second sequence 30' depending on a mapping parameter for the reference frame of the second sequence 30', and the weighting parameter and the offset parameter 50 of the current frame. The sample value reconverter 112, in turn, is configured to convert the sample values 34' of the frames 32' of the second sequence 30' from the second format to the first format using a mapping function which is inverse to the mapping function used by sample value converter 18, which maps the second dynamic range 42 onto the portion out of the first dynamic range such as 40, which is set by the mapping parameter for the respective frame of the second sequence.

Imagine, for example, residual reconstructor 118 of video decoding stage 108 currently reconstructs a residual for a current frame 32', the reconstruction being indicated by 134 in FIG. 4. Obviously, residual 134 will correspond to the one occurring during encoding at reference sign 88 in FIG. 2. Adder 120 combines this residual 134 with the temporal prediction 136 of the current frame as output by temporal predictor 122 so as to achieve the reconstructed version 138 of the current frame, i.e. frame 32'. Imagine further, that this reconstructed version 138 serves as a reference frame for a subsequently decoded frame of frame sequence 30'. Then, the weighting parameter (log WD, ŵ) and the offset parameter ô would be contained within the data stream for that subsequently decoded frame, and accordingly, the sample values 34' of the reference frame 32' would be offset and scaled in stages 124 and 126 before actually being used as the reference 140 in the temporal prediction performed by the predictor 122. This mirrors the functionality at the encoding side. The temporal predictor 122 uses motion vectors contained within the data stream to obtain the temporal prediction 136 from reference 140. As the dynamic range, or the number of bits, used for representing reference 140 is higher than the dynamic range of the original claim sequence 30, the reconstruction of which is to be output at 130 of video decoding stage 108, potentially clipping effects which could otherwise occur because of the application of the weighting and offset parameters 50 in stages 124 and 126, are effectively avoided.

Thus, the sequence 30' output by the video decoding stage 108 represents a reconstruction of the frame sequence 30 input into the video encoding stage 20 at the encoding side. The sample value reconverter 112 transfers this sequence 30' into a meaningful sequence 102 by mapping the sample values of frames 32' onto a common format having enough dynamic range in order to accommodate the dynamic range originally contained in the original material 12. This format might be the format of the sample values 16 of sequence 12, but may also deviate therefrom. In order to obtain the portion within this common dynamic range which the sample values 34' of a respective frame 32' cover, the sample value reconverter 112 sequentially applies the chain of weighting/offset parameters associated with these frames 32'. In particular, for a current frame, the sample value reconverter 112 determines this portion, i.e. the position and dimension thereof, by applying the weighting and offset parameters for the current frame onto the position and dimension of the portion previously determined for the reference frame of the current frame. By this measure, the sample value reconverter 112 recovers portions 38 and 48 shown in FIG. 1 sequentially.

Thus, in yet other words, the mapping parameter mentioned above may define a length $\hat{Y}_{max,k} - \hat{Y}_{min,k}$ of the portion 38 out of the first dynamic range 40 and a lower bound $\hat{y}_{min,k}$, or an upper bound $\hat{Y}_{max,k}$, of the portion 38 out of the first dynamic range for the current frame 32', and the parameter setter 110 may be configured to set this mapping parameter 132 for the current frame of the second sequence 30' by modifying a length $\hat{Y}_{max,l} - \hat{Y}_{min,l}$ of the portion 48 out of the first dynamic range 40, defined by the mapping parameter for the reference frame l of sequence 30', depending on the weighting parameter (log WD, ŵ) for the current frame k to derive the length $\hat{Y}_{max,k} - \hat{Y}_{min,k}$ of the portion 38 defined by the motion parameter 132 for the current frame k, and by modifying a lower or upper bound $\hat{Y}_{max,l}$ of the portion 48 out of the first dynamic range 40, defined by the mapping parameter for the reference frame l depending on the offset parameter ô for the current frame k, to derive the lower or upper bound $\hat{Y}_{min/max,k}$ as defined by the mapping parameter 132 of the current frame. Accordingly, the parameter setter 110 is steered by the weighting and offset parameters 50 contained within the data stream entering input 114 to act like parameter setter 22 controlling video encoding stage 20 and sample value converter 18.

Figure 3:
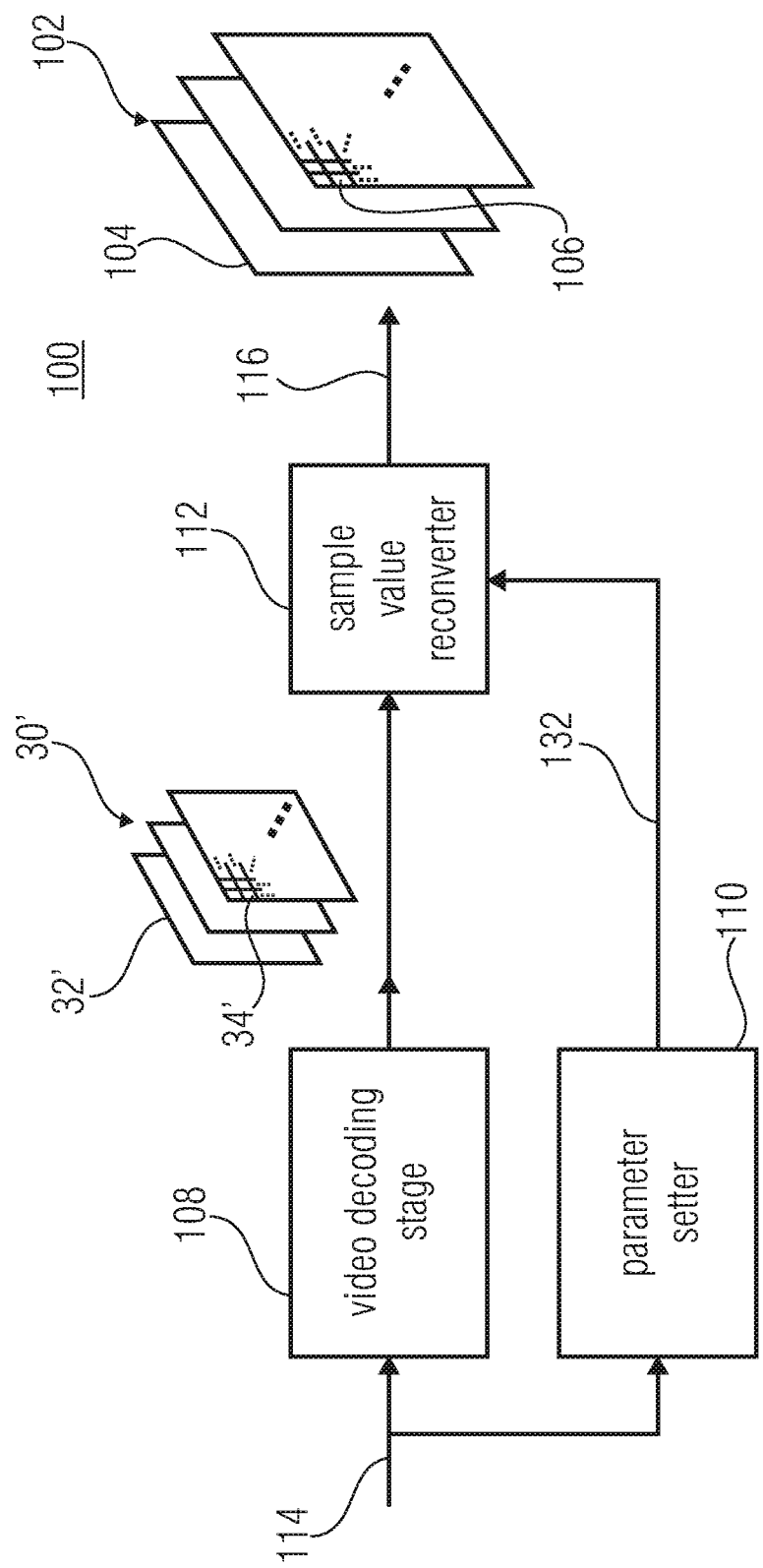
FIG. 3 shows a block diagram of a video decoder according to an embodiment.

At his moment it should be noted that the parameter setter 110 of FIG. 3 is drawn to be merely connected to sample value reconverter 112, whereas parameter setter is drawn to control both the sample value converter and the video encoding stage 20, respectively. The seeming discrepancy between encoding and decoding site stems from the aforementioned fact that encoder's video encoding stage 20 is not able freely choose the weighting/offset parameters. Rather, same are prescribed from outside, namely by parameter setter 22 which, in turn, has to take the original signal and it's distribution 44 and 46, respectively, into account when setting these weighting/offset parameters. Parameter setter 110, however, is steered by the result of this choice via the side information contained in the data stream arriving via input 110, and thus, video decoding stage 108 may use the weighting/offset parameter information contained within the data stream independently from the parameter setter's evaluation of the same information, namely the weighting/offset parameter information, and accordingly, no control path leading from the parameter setter 110 to the video decoding stage 108 is needed. However, according to an alternative embodiment, parameter setter 110 assumes responsibility for both settings and controls video decoding stage 108 accordingly from outside. In the latter case, a control path would lead from the parameter setter 110 to the video decoding stage 108.

As has already been noted above, the more detailed description of an embodiment outlined below, will use a logarithmic mapping function between both formats, i.e. a linear mapping function between the first format a logarithmic domain and a second format a logarithmic domain. Accordingly, the sample value reconverter 112 may be configured to convert the sample values $L_n$ 34' of the frames 32' of the second sequence 30' from the second format into the first format according to $$m^{(L_n+\epsilon)b^{-1}+a}$$

wherein b and a are comprised by the mapping parameter and are related to a lower bound $Y_{min}$ and upper bound $Y_{max}$ of the portion 38 out of the first dynamic range, $Y_{min}$ to $Y_{max}$, according to $$b = \frac{2^n - 1}{\log_m(\hat{Y}_{max} / \hat{Y}_{min})}, a = \log_m(\hat{Y}_{min})$$

wherein $\log_m$ is a logarithmic function to a base m, and n is an integer indicating a number of integer representation bits of the second format.

If so, the parameter setter 112 may be configured to compute a and b such that $$\frac{\log_m(\hat{Y}_{max,k} / \hat{Y}_{min,k})}{\log_m(\hat{Y}_{max,l} / \hat{Y}_{min,l})} 2^{\log WD} = \hat{w}$$

$$\frac{\log_m(\hat{Y}_{min,k} / \hat{Y}_{min,l})}{\log_m(\hat{Y}_{max,l} / \hat{Y}_{min,l})} \frac{2^n - 1}{2^{n-n_o}} = \hat{o};$$

no is an integer related to a definition range of ô, index l indexes the first frame of the second sequence, index m indexes the second frame of the second sequence, ŵ and log WD are comprised by the weighting parameter, and ô is comprised by the offset parameter.

Further, similar to the above description, the video decoding stage 108 may be configured to use a quantizer step-size parameter in reconstructing the second sequence of frames, and the parameter setter may be configured to set the quantizer step-size parameter for the frames of the second sequence depending on a length of the portion out of the first dynamic range, as set for the respective frames of the second sequence. In this regard, the parameter setter 110 may be configured to decode the quantized step-size parameter from the data stream differentially to a quantized step-size parameter for a starting frame of the second sequence.

As also described above, although the sample values of the frames of the first sequence have been assumed to be luminance floating-point values, and the sample values of the frames of the second sequence of luma have been assumed to be integer values, other possibilities do also exist.

Figure 5:
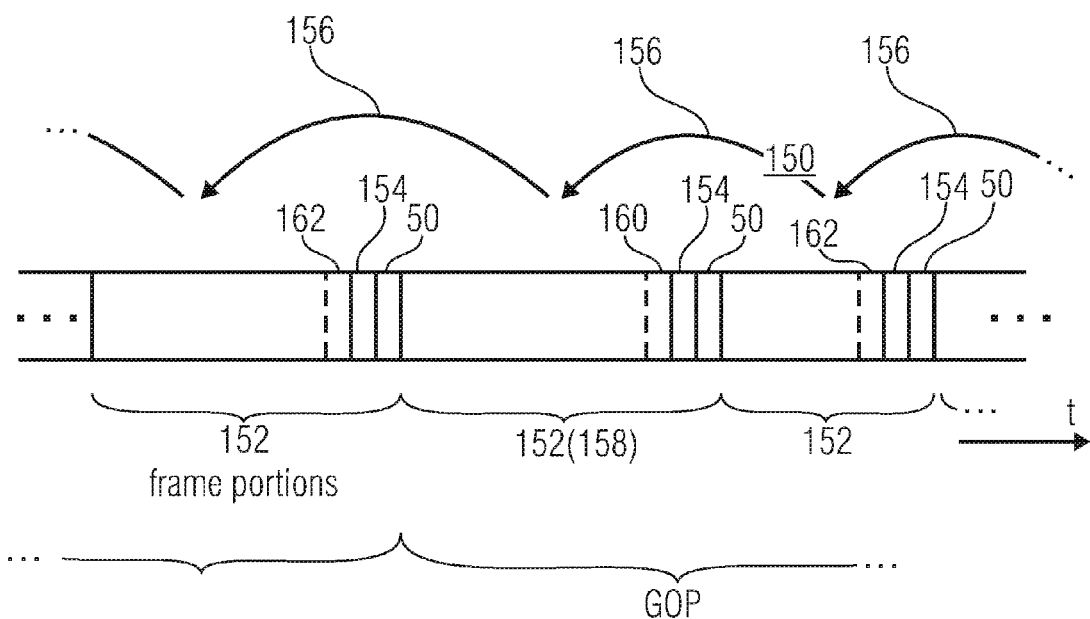
FIG. 5 shows a schematic diagram illustrating a portion of a data stream generated by the video encoder of FIG. 1 and decoded by the video decoder of FIG. 3 in accordance with an embodiment.

FIG. 5 shows an exemplary portion of a data stream being transmitted from encoding side to decoding side in accordance with the embodiments outlined above with respect to FIGS. 1 to 4. It follows from the above discussion, that the data stream 150 has the first sequence 102 of frames, the sample values of which are represented in a first format covering a first dynamic range, encoded therein in a reconstructable form. In particular, the first sequence is encoded into the data stream 150 indirectly via a second sequence 30 of frames 32 the sample values of which are represented in a second format covering a second dynamic range 42 lower than the first dynamic range, the second sequence being encoded into the data stream by a weighted temporal prediction of a first frame of the second sequence 30' using a second frame of the second sequence 30', weighted by a weighting parameter and offset by an offset parameter, as a reference, wherein the weighting parameter and the offset parameter are comprised be the data stream such that a mapping parameter 132 for the first frame of the second sequence 30' depends on a mapping parameter for the second frame of the second sequence 30', the weighting parameter and the offset parameter, and the sample values 34' of the frames 32' of the second sequence is converted from the second format to the first format using a mapping function which maps the second dynamic range 42 onto a portion out of the first dynamic range 40 which is set by the mapping parameter for the respective frame of the second sequence, reconstruct the first sequence. In other words, data stream may by structured into frame portions 152 each associated with a respective one of the frames 30' and 104, respectively. Each frame 30' may be coded into the data stream 150 in unit of blocks. Each frame portion 152 may include motion prediction data 154 including, for example, a motion vector. Additionally, each frame portion 152 data may include the weighting and offset parameters 50 for the respective claim. The data stream may be coded such that the motion prediction data 154 of each frame portion refers back 156 to the frame portion immediately preceding in time t, i.e. when arranging the frame portions 152 along the presentation time axis. That is, each frame may be a P frame using the immediately preceding frame as reference frame, and the portion out of the common dynamic range 40 may be updated using this dependency chain. Merely, the overall first, i.e. starting, frame 158 of the frame sequence, may be an I frame, or the starting frames of each GOP, i.e. group of (immediately preceding) pictures. This starting frame 158 may have incorporated therein an explicit coding 160 of the mapping parameters for this first frame 158. Alternatively, even this explicit coding 160 may be unnecessary. Further, each frame 152, or each frame 152 but the starting frame 158, may have encoded therein a quantizer step-size parameter 162, prescribing the quantizing step size to be used in dequantizing in residual reconstructor 118 and being set in dependency on the length of portion 38. In particular, the quantizer step-size parameter 162 may have been coded into data stream in a differential manner using the (explicitly or implicitly determined) quantizer step-size parameter of the starting frame portion 158 as a reference.

After having described, by use of rather general terms, embodiments for an encoding and decoding apparatus, more detailed embodiments representing concrete implementations of the above embodiments, are outlined below. In accordance with the concrete implementation details outlined below, a frame-wise adaptive luminance-to-luma mapping is used to perform the transition between the video de/encoding stage and the sample value re/conversion, respectively. In accordance with the embodiments outlined below, the weighted prediction tool of H.264/AVC is exploited to maintain the temporal coherence. In other words, in accordance with the embodiments outlined below, the video encoding stage and the video decoding stage of the above embodiments act like H.264 conform entities, i.e. video encoding stage 20 generates an H.264 conform data stream and a video decoding stage 108 is implemented in conformity with the H.264/AVC standard. The data stream of FIG. 5 may even be completely H.264/AVC conform. The weighted prediction tool is, thus, in accordance with the following embodiments not only exploited to maintain the temporal coherence, but, at the same time, to transmit the adaptive mapping parameters used for the sample value conversion. Further, an example will be given as to how to adapt the quantization parameter (QP) for each frame dependent on the adaptive mapping.

Thus, in the following, implementation details with respect to the above-outlined embodiments of FIGS. 1-5 are presented below by use of mathematical equations in more detail. After that, in Section 2, experimental results using these implementation details, are presented.

1.1. Dynamic Range Adaptive Luminance Mapping

In the following we re-visit the luminance-to-luma mapping for video coding applications. The trade-off between the representable luminance range $[Y_{min}, Y_{max}]$, the luma bit depth n and the associated relative precision can be seen in the following more general formulations of the luminance-to-luma mapping functions:

$$L_n = \left\lfloor \frac{2^n - 1}{\log_2(Y_{max}/Y_{min})}(\log_2(Y) - \log_2(Y_{min})) \right\rfloor \quad (2)$$

$$Y = 2(L_n + 0.5)\frac{\log_2(Y_{max}/Y_{min})}{2^n - 1} + \log_2(Y_{min}). \quad (3)$$

Figure 6:
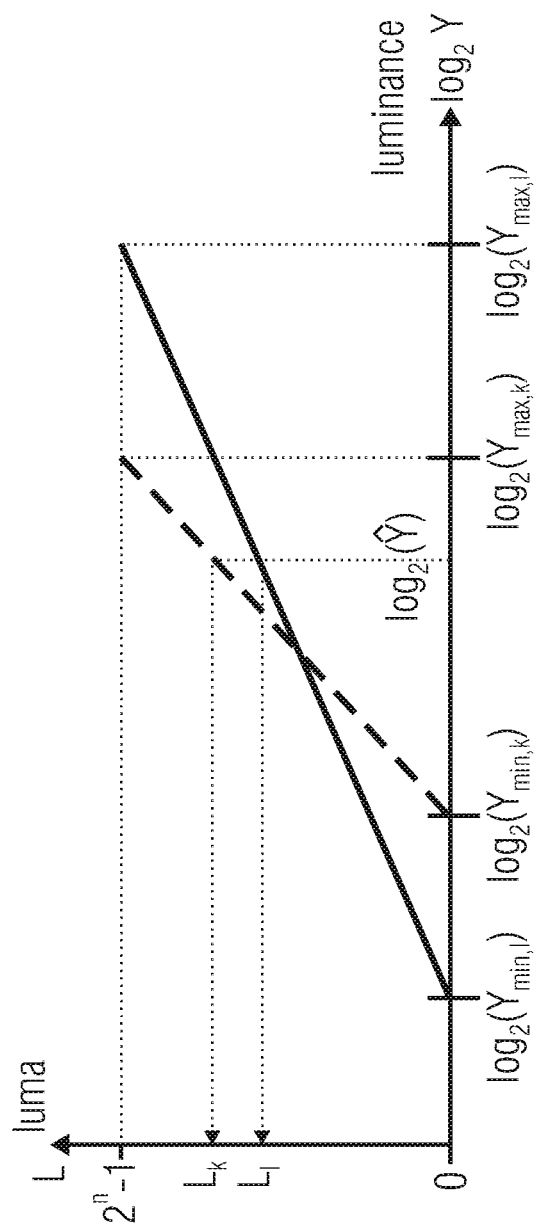
FIG. 6 shows a graph with an exemplary adaptive logarithmic luminance-to-luma mapping with different ranges for different frames.

This linear relationship between the logarithm of the luminance Y and the luma space L is also depicted FIG. 6. FIG. 6 shows an adaptive logarithmic luminance-to-luma mapping: different ranges for different frames l and k result in different mapping functions. Consequently, different luma values can represent the same luminance value.

Obviously, the mapping achieves the highest fidelity when $Y_{min}$ and $Y_{max}$ equals the minimum and maximum luminance of the current video frame, respectively. That is, if the existing luminance values in a video frame are mapped to the full luma range by the mapping function with the steepest possible slope. However, since the dynamic ranges can vary from one frame to the next (even in a static scene, due to noise), such a straightforward adaptation would break the temporal coherence of the video sequence and prevent an efficient temporal prediction. The next section will present an adaptive mapping that takes such effects into account.

1.2. Temporally Coherent Adaptive Luminance Mapping

Consider that two consecutive frames k and l=k+1 of an HDR video sequence exhibit different luminance ranges $[Y_{min,k}, Y_{max,k}]$ and $[Y_{min,l}, Y_{max,l}]$, respectively. Obviously, using the extrema of each frame in (2) will result in a different mapping for each frame. That is, the same luminance value $\hat{Y}=Y_k=Y_l$ in frame k and l will be mapped to different luma values $L_{n,k}$ and $L_{n,l}$, respectively as exemplified in FIG. 1. Plugging (3) into (2) using a different mapping for frame k and l, respectively, yields:

$$L_{n,l} = (L_{n,k} + 0.5) \frac{\log_2(Y_{max,k}/Y_{min,k})}{\log_2(Y_{max,l}/Y_{min,l})} + \quad (4)$$

$$(2^n - 1) \frac{\log_2(Y_{min,k}/Y_{min,l})}{\log_2(Y_{max,l}/Y_{min,l})}$$

$$= (L_{n,k} + 0.5) \cdot w + o$$

Apparently, the relation of two luma values $L_{n,k}$ and $L_{n,l}$ stemming from the same luminance value $\hat{Y}$ is entirely defined by a scale w and an offset o. w and o can be easily derived from the ranges $[Y_{min,k}, Y_{max,k}]$ and $[Y_{min,l}, Y_{max,l}]$.

H.264/AVC is the first international video coding standard defining the syntax for a weighted prediction (WP) tool [7]. The original intention of WP is to enhance the coding efficiency for fade-in and fade-out sequences where motion compensated prediction usually fails. It allows to explicitly signal a weight parameter $\hat{w}$ and an offset parameter $\hat{o}$ per slice. The parameters can be used to weight and shift the reference frame for enhancing the temporal prediction. Equation (4) shows that a change of the dynamic range of successive frames merely results in a weighting w and shifting o of identical luminance values in the luma space. Therefore, the WP syntax of H.264/AVC is perfectly suited to allow for an efficient temporal prediction despite any changes in the luminance range. Consider, e.g., the case that a nearly static scenery is recorded by an HDR capable camera facing the bright sun. When the sun is now abruptly covered by a cloud, the dynamic range will change by several orders of magnitude whereas the luminance values of all the foreground objects will approximately remain constant. If we can use the WP tools to adapt the luma values of the reference frame, it allows for a perfect temporal prediction of the foreground pixels that stem from the same luminance values. Furthermore, the WP parameter information is sufficient to convey any needed side information for a frame-wise adaptation of the luminance-to-luma mapping as it will be shown in the following.

In H.264/AVC the precision and dynamic range of $\hat{w}$ and $\hat{o}$ is limited. Both parameters can take on integer values between −128 and 127. The precision of $\hat{w}$ is confined by a quantization interval of $1/2^{\log WD}$, where log WD is signaled explicitly and can take on integer values from 0 to 7. Consequently, a higher log WD value leads to a more fine-grained representation of the parameter $\hat{w}$. It also means that more bits are needed for coding the weighting factors and a narrowing of the range of the effective scaling [7]. The step size of the offset parameter is defined by $2^{n-8}$ in order to take into account the bit depth n of the luma representation in the H.264/AVC coder. Consequently, in order to allow for a perfect temporal prediction of unchanged luminance values from one frame to the next, it is needed to quantize the change of the adaptive mapping function in such a way that it can be represented by the H.264/AVC WP parameters $\hat{w}$ and $\hat{o}$.

That is, given the dynamic luminance range covered by the mapping function of frame k, $[\hat{Y}_{min,k}, \hat{Y}_{max,k}]$, we have to find the minimum $\hat{Y}_{max,l}$ and the maximum $\hat{Y}_{max,l}$ that fulfill $$\frac{\log_2(\hat{Y}_{max,k}/\hat{Y}_{min,k})}{\log_2(\hat{Y}_{max,l}/\hat{Y}_{min,l})} \cdot 2^{\log WD} = \hat{w}; \{\hat{w} \in \mathbb{Z} \mid -128 \leq \hat{w} \leq 127\} \quad (5)$$

and $$\frac{\log_2(\hat{Y}_{min,k}/\hat{Y}_{min,l})}{\log_2(\hat{Y}_{max,l}/\hat{Y}_{min,l})} \cdot \frac{2^n - 1}{2^{n-8}} = \hat{o}; \hat{o} \in \{\mathbb{Z} \mid -128 \leq \hat{o} \leq 127\} \quad (6)$$

under the constraints $$\hat{Y}_{max,l} \geq Y_{max,l} \text{ and } \hat{Y}_{min,l} \leq Y_{min,l}. \quad (7)$$

The latter two inequalities assure that the luminance range covered by the adaptive mapping covers at least the range of luminance range present in the current frame, $[Y_{min,l}, Y_{max,l}]$.

In practice, parameter setter 22 may find the solution to this problem by solving (5) and (6), setting $\hat{Y}_{max,l}=Y_{max,l}$ and $\hat{Y}_{min,l}=Y_{min,l}$ and rounding towards zero. This yields the initial values for $\hat{w}$ and $\hat{o}$ and (5) and (6) w.r.t. $\hat{Y}_{min,l}$ and $\hat{Y}_{max,l}$, respectively can be solved:

$$\hat{Y}_{min,l} = 2^{\left[\log_2(Y_{min,k}) - \frac{o \cdot 2^{\log WD} 2^{n-8}}{\hat{w} \cdot 2^n - 1} \log_2(Y_{max,k}/Y_{min,k})\right]} \quad (8)$$

$$\hat{Y}_{max,l} = 2^{\left[\frac{2^{\log WD}}{\hat{w}} \cdot \log_2(Y_{max,k}/Y_{min,k}) + \log_2(\hat{Y}_{min,l})\right]}. \quad (9)$$

If the results violate one of the conditions in (7), parameter setter 22 may decrease $\hat{w}$ or increase $\hat{o}$ by 1, respectively and re-calculate (8) and (9).

After finding the best luminance range $[\hat{Y}_{min,l}, \hat{Y}_{max,l}]$, of frame l w.r.t. frame k, the parameter setter 22 and the sample value converter 18 may use these values for the mapping in (2). Furthermore, the weight and offset parameters $\hat{w}$ and $\hat{o}$ are readily available for usage in the weighted temporal prediction of the H.264/AVC video encoder 20. Finally, it can be seen from the relations in (5) and (6) that these parameters fully suffice to exactly recover the luminance range of the current frame 38 given the range of the previous frame 48. No additional side information is needed for the adaptive mapping when the mapping of the first frame (and possibly IDR frames) covers the maximal visible dynamic range. Otherwise, the range for the first frame may be signaled explicitly to the decoder as illustrated by dashed line 28. In general, however, the scheme according to Section 1 avoids that the float-valued scaling information has to be transmitted as side information for each frame, otherwise complicating standard conformant coding and increasing bit rate.

1.3. Temporally Coherent Quantization

In accordance with the above measures, for each frame, different luminance ranges are mapped to luma code values. Therefore, using the identical QP during the H.264/AVC encoding process, would lead to a varying quantization of the luminance space, depending on the mapping. In other words, even though the encoder might use a constant quantization, the effective quantization will largely vary across time, leading to strong variations in quality and bit rate. Therefore, in accordance with an embodiment, the coding stages 20 and 108 take the luminance mapping range into account and find a suitable ΔQP for each frame, accordingly. Here, ΔQP denotes a QP offset for the current frame w.r.t. the reference QP that is used to encode the first frame. It can be easily seen in FIG. 1 that, in order to introduce the same effective quantization to the luminance values, the quantizer step sizes $Q_{step,l}$ and $Q_{step,k}$ of the current frame l and an arbitrary reference frame k have to be related according to $$Qrel_{l,k} = \frac{Q_{step,l}}{Q_{step,k}} = \frac{\log_2(Y_{max,k}/Y_{min,k})}{\log_2(Y_{max,l}/Y_{min,l})}. \tag{10}$$

Taking into account the fact that, per definition $Q_{step}$ approximately doubles when the QP value is increased by 6 units we can state:

$$Qrel_{l,k} \approx 2^{\Delta QP_{l,k}/6} \Leftrightarrow \Delta QP_{l,k} = \text{round}(6 \log_2(Qrel_{l,k})). \tag{11}$$

In this work, we use the first frame of a sequence as reference frame for calculating the QP offset values for each frame. That is, an arbitrary frame l will be quantized with QP=$QP_1$+$\Delta QP_{l,1}$.

2. EXPERIMENTAL RESULTS

For evaluating the temporally coherent luminance-to-luma mapping of Section 1, we performed coding experiments with three HDR test sequences: Panorama, Tunnel, and Sun. All sequences have a resolution of 640×480 pixel and a frame rate of 30 fps. The panorama test sequence was generated by panning a 8000×4000 pixel HDR panorama image. It and shows dark interior areas as well as very bright sun reflections from outside a window. Its overall dynamic range is of the order of $10^{10}$:1. Both, Tunnel and Sun were taken from inside a driving car with an HDR video camera and are freely available from Max-Planck Institute [8]. The former one shows a drive through a dark tunnel, the latter one shows a drive on a highway facing the bright sun. The overall dynamic range represented in these sequences is $10^5$:1 and $10^7$:1, respectively. In our experiments we use two metrics to evaluate the quality of the decoded HDR videos: the HDR visible difference predictor (VDP) [9] and the perceptually uniform peak signal-to-noise ratio (PU PSNR) [10]. The former one estimates the percentage of pixels in a pair of images that an observer will notice to be different with a probability of more than 75%. The latter metric is a straightforward extension of the common PSNR metric to HDR. For LDR images it is assumed that the gamma corrected pixel code values are perceptually uniform, that is, equal error amplitudes are equally visible in bright and dark regions of an image. However, this assumption does not hold for HDR images and therefore, the code values are to be scaled to a perceptually uniform space before meaningful PSNR values can be calculated [10].

For encoding the sequences, they are first transformed from RGB floating-point values to the Log Luv space and then encoded with the H.264/AVC reference software JM 17.2. The luma component is encoded with a bit depth of 12 bit/sample, the u' and v' components are subsampled by a factor of two vertically and horizontally and encoded with 8 bit/sample. We use the same configuration of the H.264/AVC high profile with 8×8 transform, IPPP GOP structure, intra frame period of 15, and CABAC enabled for all experiments. A fixed reference QP is selected for each encoder run and no rate-control is enabled. However, the frame-wise QP may deviate from this reference QP as described in Sec. 1.3. After decoding the sequences, they are mapped back to RGB floating-point values and their quality is evaluated according to the metrics described before.

Figure 7:
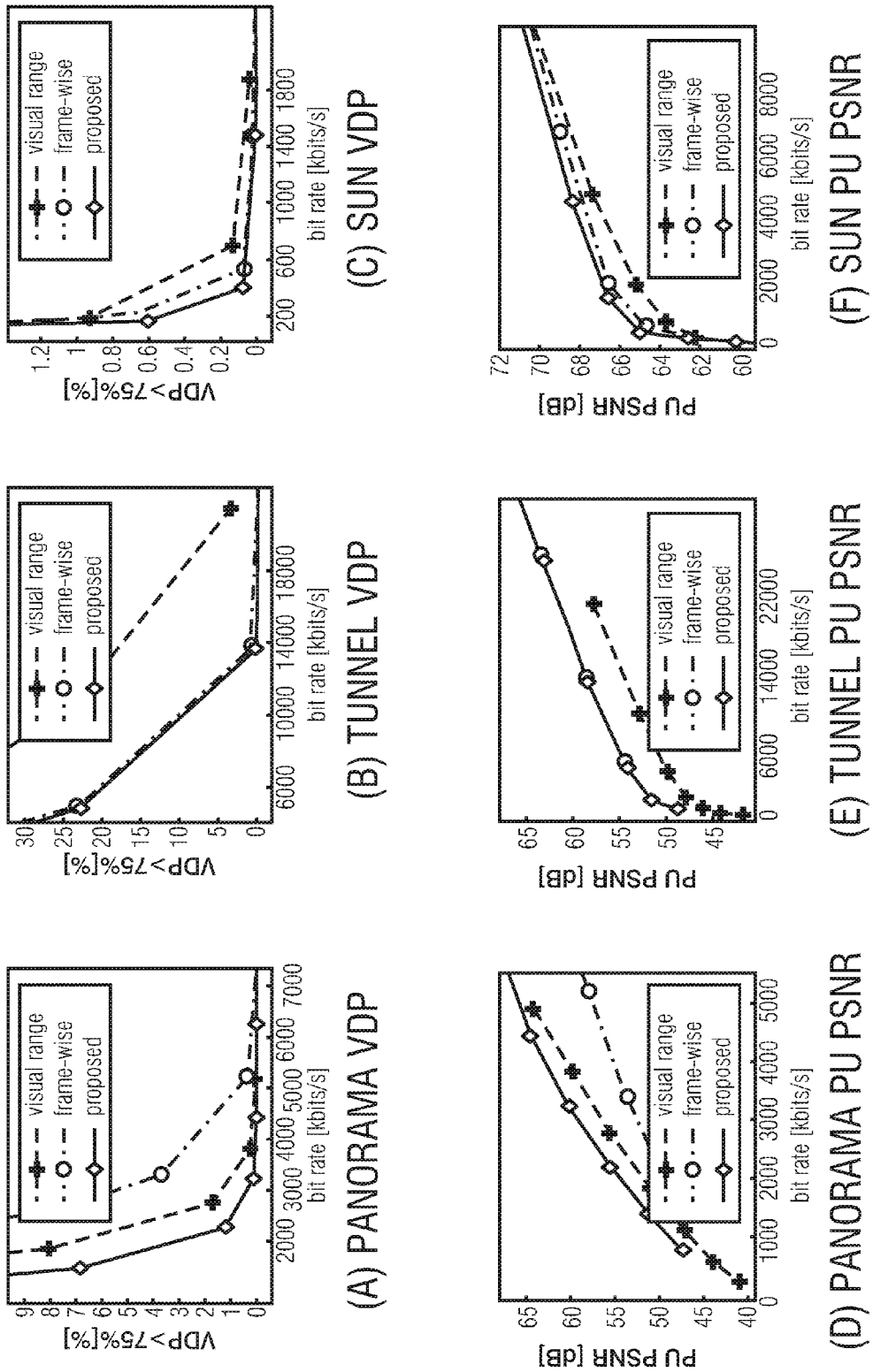
FIG. 7 shows coding results for three cases, namely using the temporal coherent mapping according to the embodiment described with respect to the figures, using frame-wise adaptation without obeying temporal coherence, and using constant mapping, for different video pieces (left, middle, right), and using different measures for the quality degradations (upper and lower row).

In particular, FIG. 7 shows the coding results for three cases: temporally coherent mapping according to Section 1 ("proposed"), frame-wise adaptation for each frame without temporal coherence ("frame-wise") [6], and constant mapping of the whole visual luminance range [$10^{-4}$, $10^8$] ("visual range"). Upper row: visible difference predictor (VDP). Lower row: perceptually uniform peak signal-to-noise ration (PU PSNR).

FIG. 7 shows the coding results for all test sequences in terms of the VDP averaged over all decoded frames (upper row) and in terms of mean PU PSNR of the luminance component (lower row). In particular, FIG. 7 shows the coding results for three cases: temporally coherent mapping ("proposed"), frame-wise adaptation for each frame w/o temporal coherence ("frame-wise") [6], and constant mapping of the whole visual luminance range [10-4, 108] ("visual range"). Upper row: visible difference predictor (VDP). Lower row: perceptually uniform peak signal-to-noise ratio (PU PSNR).

The proposed method ("proposed") is compared with two reference methods in FIG. 7: straightforward frame-wise adaptation of the luminance-to-luma mapping to the dynamic range of each frame without taking into account the temporal coherence ("frame-wise") [6], and constant mapping of the whole perceivable luminance range [10-4, 108] ("visual range"). In the latter case, the luminance range of the mapping function might exceed the range of occurring luminances in many HDR video sequences. However, in a real-time coding application it is not possible to narrow the mapping range to the absolute luminance range of a sequence, because this would request the processing of the whole sequence before encoding. FIG. 7 clearly shows that the proposed mapping significantly outperforms the reference methods for all test sequences. It is worth noting here that the VDP metric is a threshold metric that only offers an estimate about if a pixel is perceived erroneous or not. It does not state how annoying this error is for an observer. Thus, e.g., the results in FIG. 7(*a*) can be interpreted as follows: if we allow about 1% of the pixels to be perceived erroneously, with the proposed mapping, we only need a bit rate of less than 2500 kbits/s. This is a reduction of about 50% (25%) compared to the 5000 kbits/s (3250 kbits/s) we have to spend to achieve same VDP value in the "visual range" ("frame-wise") scenario. Likewise, huge rate savings can be observed for the Tunnel and Sun test sequences in FIGS. 7(*b*) and (*c*).

As expected, the PU PSNR results in FIGS. 7(*d*)-(*f*) depict similar performance characteristics as the VDP results for all sequences. Furthermore, they allow a quantitative conclusion of the gain in quality that can be achieved with the proposed method for a large range of bit rates. E.g., for the Panorama sequence the PU PSNR value of the proposed method exceeds the PU PSNR value of the "visual range" mapping by 3 dB at 3250 kbits/s (cf. FIG. 7(*d*)). This means that the mean squared error in the perceptually uniform luminance space is halved at the same bit rate and the visual quality is increased significantly.

It is worth noting, that for the Panorama sequence the frame-wise adaptive mapping has a very detrimental effect on the coding efficiency compared to the non-adaptive "visual range" mapping. This sequence exhibits very large and fast variations of its dynamic range and therefore, in the case of the frame-wise adaptive mapping, the temporal prediction fails (cf. FIGS. 7(*a*),(*d*)). On the other hand, it can be observed in FIGS. 7(b) and (e) that the proposed method performs almost identical to the "frame-wise" mapping. In this sequence, the temporal changes of the dynamic range are very smooth. In our experiments we further observed that for the "frame-wise" mapping there exist strong temporal variations of the bit rate and quality whenever the dynamic range changes significantly. This negative effect could be circumvented by the temporally coherent quantization and mapping of the proposed method.

3. CONCLUSIONS

In Section 1, thus, an adaptive luminance-to-luma mapping has been proposed that allows the compression of floating-point high dynamic range video data with the state-of-the-art H.264/AVC video coding standard. Unlike other methods the mapping is adapted to the dynamic range of each frame. Nevertheless, temporal coherence is sustained by exploiting the weighted prediction tools of H.264/AVC and by applying a frame-wise adaptation of the quantization parameter in accordance with the mapping function. No additional side information is needed and significant bit rate savings of up to 50% compared to non-adaptive methods can be observed at the same quality.

Finally, it should be noted that all the details presented in Sections 1-3, could also vary in some sense. For example, neither the weighting/offset parameters mentioned with respect to FIGS. 1-5, nor the weighting/offset parameters mentioned in Sections 1-3, are restricted to those of the H.264/AVC standard, i.e. log WD, $\hat{w}$ and $\hat{o}$. The weighting/offset parameters could be transmitted in form of different syntax elements. In particular, it is not needed to split up the transmission of the weighting parameter into two syntax element entities log WD, $\hat{w}$. Similarly, it should be noted that the sequence 30 and 30', respectively, could be coded in form of an IPPPP . . . sequence—or in form of IPPPP . . . GOPs—with using the respective immediately preceding frame as reference frame. The first I frame could represent a starting frame as mentioned in Section 1.3 referring to which the quantization parameter may be readjusted. However, all the embodiments outlined above are not restricted to such a type of sequence. Even B frames could be used within the coding scheme in video encoding stage 20 and video decoding stage 108 when taking additional measures in the parameter setter 22 into account in order to fulfill the constraints posed by both weighting/offset parameters for the current frame with respect to the two reference frames, that is, by taking into account the weighting/offset parameters of the reference frame and the weighting/offset parameters of the other reference frame of the current frame with both parameter pairs being transmitted within the data stream.

Further, as already noted above, instead of a luminance-to-luma mapping, another mapping could be the subject of the embodiments outlined above. In other words, the sample values could pertain to other information than luminance. Further, the implementation of the video encoding stage 20 and the video decoding stage 108 of FIGS. 2 and 4 are to be understood merely as being of illustrative nature. For example, the entropy encoder 62 responsible for entropy coding the residual signal 88 could be left off. Similarly, an entropy decoder 129 could optionally connect it between input 128 and residual reconstructor 118 of video decoding stage 108 of FIG. 4.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The '-0p-implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In even other words, embodiments suitable for an efficient compression of high dynamic range video (HDR) sequences have been described. In order to obtain a coded representation that is compatible with the H.264/AVC video coding standard, the float-valued HDR values are mapped to a suitable integer representation. The mapping used is adapted to the dynamic range of each video frame. Furthermore, to compensate for the associated dynamic contrast variation across frames, a weighted prediction method and quantization adaptation are introduced.

From another point of view, above embodiments are an improvement of the Adaptive-Log Luv transform also described in EP10151074.1, the description of which is incorporated herewith for further details. Basically, an adaptive logarithmic mapping of float to integer values similar to that in EP10151074.1 has been used. The parameters of this mapping, however, are no longer totally free. Instead they are, in accordance with the above embodiments, restricted to fit the characteristics of the H.264/AVC video codec and especially the weighted prediction (WP) tool of H.264/AVC. With these restrictions, the following benefits were gained:
(1) The WP tool can be used to ensure temporal coherence.
(2) The H.264/AVC syntax for WP can be used to signal the parameters of the Log Luv mapping, thus removing the need for additional side information. IN the above description, it has been shown how to adapt the quantization parameter of the H.264/AVC coder dependent on the adaptive mapping.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Erik Reinhard, Greg Ward, Sumanta Pattanaik, and Paul Debevec, High Dynamic Range Imaging: Acquisition, Display, and Image-Based Lighting, Morgan Kaufmann Publishers Inc., San Francisco, Calif., USA, 2005.
[2] J. A. Ferwerda, "Elements of early vision for computer graphics," IEEE Comp. Graph. and Appl., vol. 21, no. 5, pp. 22-33, 2001.
[3] Gregory Ward Larson, "The Log Luv encoding for full gamut, highdynamic range images," Journal of Graph. Tools, vol. 3, no. 1, pp. 15-31, 1998.
[4] Rafał Mantiuk, Grzegorz Krawczyk, Karol Myszkowski, and Hans-Peter Seidel, "Perception-motivated high dynamic range video encoding," ACM Trans. Graph., vol. 23, no. 3, pp. 733-741, 2004.
[5] Masahiro Okuda and Nicola Adami, "Effective color space representation for wavelet based compression of HDR images," in International Conference on Image Analysis and Processing, 2007, pp. 388-392.
[6] Ajit Motra and Herbert Thoma, "An adaptive Log Luv transform for high dynamic range video compression," in Proc. Intl. Conf. on Image Processing (ICIP), Hong Kong, China, September 2010.
[7] J. M. Boyce, "Weighted prediction in the H.264/MPEG AVC video coding standard," in Proc. Intl. Symposium on Circuits and Systems (ISCAS), May 2004, pp. 789-792.
[8] Grzegorz Krawczy, "HDR video environment maps samples," http://www.mpi-inf.mpg.de/resources/hdr/video/, MPI
[9] Rafał Mantiuk, Scott Daly, Karol Myszkowski, and Hans-Peter Seidel, "Predicting visible differences in high dynamic range images—model and its calibration," in SPIE Human Vision and Electronic Imaging X, 2005.
[10] TunC, Ozan Aydin, Rafal Mantiuk, and Hans-Peter Seidel, "Extending quality metrics to full dynamic range images," in SPIE Human Vision and Electronic Imaging XIII, San Jose, USA, January 2008

The invention claimed is:

1. Video decoder for reconstructing a first sequence of frames, the sample values of which are represented in a first format covering a first dynamic range, from a data stream, comprising
a video decoding stage configured to reconstruct, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference;
a parameter setter configured to set a mapping parameter for the first frame of the second sequence depending on a mapping parameter for the second frame of the second sequence, the weighting parameter and the offset parameter, and
a sample value reconverter configured to convert the sample values of the frames of the second sequence from the second format to the first format using a mapping function which maps the second dynamic range onto a portion out of the first dynamic range which is set by the mapping parameter for the respective frame of the second sequence.

2. Video decoder according to claim 1, wherein the mapping parameter defines a length of the portion out of the first dynamic range and a lower and upper bound of the portion out of the first dynamic range, and wherein the parameter setter is configured to set the mapping parameter for the first frame of the second sequence by modifying a length of the portion out of the first dynamic range, defined by the mapping parameter for the second frame of the second sequence, depending on the weighting parameter to derive the length of the portion defined by the mapping parameter for the first frame of the second sequence, and by modifying a lower or upper bound of the portion out of the first dynamic range, defined by the mapping parameter for the second frame of the second sequence depending on the offset parameter, to derive the first frame of the second sequence.

3. Video decoder according to claim 1, wherein the sample value reconverter is configured to convert the sample value $L_n$ of the frames of the second sequence from the second format into the first format according to $$m^{(L_n+e)b^{-1}+a}$$

wherein b and a are comprised by the mapping parameter and are related to a lower bound $Y_{min}$ and upper bound $Y_{max}$ of the portion out of the first dynamic range, $\hat{Y}_{min}$ to $\hat{Y}_{max}$, according to $$b = \frac{2^n - 1}{\log_m(\hat{Y}_{max}/\hat{Y}_{min})}, \ a = \log_m(\hat{Y}_{min})$$

wherein $\log_m$ is a logarithmic function to a base m, and n is an integer indicating a number of integer representation bits of the second format.

4. Video decoder according to claim 3, wherein the parameter setter is configured to compute a and b such that $$\frac{\log_m(\hat{Y}_{max,k}/\hat{Y}_{min,k})}{\log_m(\hat{Y}_{max,l}/\hat{Y}_{min,l})} 2^{\log WD} = \hat{w}$$

$$\frac{\log_m(\hat{Y}_{min,k}/\hat{Y}_{min,l})}{\log_m(\hat{Y}_{max,l}/\hat{Y}_{min,l})} \frac{2^n - 1}{2^{n-n_o}} = \hat{o}$$

$n_o$ is an integer related to a definition range of ô, index 1 indexes the first frame of the second sequence, index k indexes the second frame of the second sequence, ŵ and $_{log}$ $_{WD}$ are comprised by the weighting parameter, and ô is comprised by the offset parameter.

5. Video decoder according to claim 1, wherein the video decoding stage is configured to use a quantizer step-size parameter in reconstructing the second sequence of frames, and the parameter setter is configured to set the quantizer step-size parameter for the frames of the second sequence depending on a length of the portion out of the first dynamic range, as set for the respective frames of the second sequence.

6. Video decoder according to claim 5, wherein the parameter setter is configured to decode the quantizer step-size parameter from the data stream differentially to a quantized step-size parameter for a starting frame of the second sequence.

7. Video decoder according to claim 1, wherein the sample values of the frames of the first sequence are luminance floating-point values, and the sample values of the frames of the second sequence of luma inter values.

8. Method for reconstructing a first sequence of frames, the sample values of which are represented in a first format covering a first dynamic range, from a data stream, comprising
reconstructing, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference;
setting a mapping parameter for the first frame of the second sequence depending on a mapping parameter for the second frame of the second sequence; the weighting parameter and the offset parameter, and
converting the sample values of the frames of the second sequence from the second format to the first format using a mapping function which maps the second dynamic range onto a portion out of the first dynamic range which is set by the mapping parameter for the respective frame of the second sequence.

9. A non-transitory digital storage medium storing a data stream from which a first sequence of frames, the sample values of which are represented in a first format covering a first dynamic range, is reconstructable, wherein the first sequence is encoded into the data stream indirectly via a second sequence of frames the sample values of which are represented in a second format covering a second dynamic range lower than the first dynamic range, the second sequence being encoded into the data stream by a weighted temporal prediction of a first frame of the second sequence using a second frame of the second sequence, weighted by a weighting parameter and offset by an offset parameter, as a reference, wherein the weighting parameter and the offset parameter are comprised be the data stream such that a mapping parameter for the first frame of the second sequence depends on a mapping parameter for the second frame of the second sequence, the weighting parameter and the offset parameter, and the sample values of the frames of the second sequence is converted from the second format to the first format using a mapping function which maps the second dynamic range onto a portion out of the first dynamic range which is set by the mapping parameter for the respective frame of the second sequence, reconstruct the first sequence.

10. A non-transitory computer readable digital storage medium comprising stored thereon a computer program comprising a program code for performing, when running on a computer, a method for reconstructing a first sequence of frames, the sample values of which are represented in a first format covering a first dynamic range, from a data stream, comprising
reconstructing, from the data stream, a second sequence of frames the sample values of which are represented in a second format covering a second dynamic range lower than the first dynamic range, by a weighted temporal prediction of a first frame of the second sequence using a second frame of the second sequence, weighted by a weighting parameter and offset by an offset parameter comprised by the data stream, as a reference;
setting a mapping parameter for the first frame of the second sequence depending on a mapping parameter for the second frame of the second sequence; the weighting parameter and the offset parameter, and
converting the sample values of the frames of the second sequence from the second format to the first format using a mapping function which maps the second dynamic range onto a portion out of the first dynamic range which is set by the mapping parameter for the respective frame of the second sequence.

* * * * *